(12) United States Patent
Hong

(10) Patent No.: US 12,486,976 B2
(45) Date of Patent: Dec. 2, 2025

(54) DECORATIVE LIGHT STRING RETRACTABLE DEVICE

(71) Applicant: Guangdong Kuifa Trading Co., Ltd., Dongguan (CN)

(72) Inventor: Kui Hong, Dongguan (CN)

(*) Notice: Subject to any disclaimer, the term of this patent is extended or adjusted under 35 U.S.C. 154(b) by 0 days.

(21) Appl. No.: 19/011,741

(22) Filed: Jan. 7, 2025

(65) Prior Publication Data
US 2025/0146658 A1  May 8, 2025

(30) Foreign Application Priority Data

Jul. 31, 2024  (CN) .......................... 202421847406.9

(51) Int. Cl.
*F21V 27/00*  (2006.01)

(52) U.S. Cl.
CPC .................................... *F21V 27/00* (2013.01)

(58) Field of Classification Search
CPC .............................. F21V 27/00; F21V 27/005
See application file for complete search history.

(56) References Cited

U.S. PATENT DOCUMENTS 5,695,148 A * 12/1997 Christensen ........... B65H 75/18
242/405.3

* cited by examiner

*Primary Examiner* — Sean P Gramling
(74) *Attorney, Agent, or Firm* — Daniel M. Cohn; Howard M. Cohn

(57) ABSTRACT

The utility model relates to the technical field of household appliances and discloses a decorative light string retractable device, wherein the retractable device comprises a retractable main component and a retractable auxiliary component connected to one end of the retractable main component through a holding component. The retractable main component and the holding component form a storage structure for the decorative light string. The retractable main component is adopted to retract the decorative light string, the holding component is adopted to hold the decorative light string when retracting the decorative light string, and the retractable auxiliary component is adopted to fix one end of the decorative light string when storing the decorative light string in the retractable main component. The holding component is provided with a storage compartment, the storage compartment is adopted for storing items, and a compartment cover is provided at the opening of the storage compartment to prevent stored items from falling out of the storage compartment. By utilization of the utility model, the decorative light string can be easily and stably retracted, unwinding and winding, which greatly improves the efficiency of retracting, unwinding and winding the decorative light string, makes it more convenient to retract, unwind and win the decorative light string, ensures the storage effect of the decorative light string, and ensures the normal use of the utility model or the decorative light string.

1 Claim, 5 Drawing Sheets

DECORATIVE LIGHT STRING RETRACTABLE DEVICE

TECHNICAL FIELD

The utility model relates to the technical field of decorative light string appliances, in particular to a decorative light string retractable device.

BACKGROUND TECHNOLOGY

The decorative light string is a string light connected by multiple small lights and wires. It can be hung indoors, in plants or other places that need decoration, and is mainly used for holiday decoration or venue decoration to create an environmental atmosphere and enhance visual experience. However, after production, some of these decorative light strings are simply bundled and sold from the factory, or bundled and matched with a simple packaging box for sale from the factory; while those slightly more exquisite manufacturers will use simple plastic spools to wind the decorative light strings, and then sell them out of the factory.

For the packaging method of binding and bundling, although the operation is simple, when users untie the decorative light strings for installation, because the decorative light strings are set in bundles, it is easy for them to get entangled with each other, and even the wires knotting occurs during the untie process, which will affect the smooth development of lighting installation; For the packaging method of simple plastic spool winding, although it can ensure the smooth unwinding of the decorative light strings wound on the plastic spools to a certain extent, and reduce the situation of winding or knotting, when the simple plastic spools wind the decorative light strings to be stored, because the simple plastic spool has no structure to pre-fix the decorative light string, if the winding is not tight, the decorative light string is still easy to displace or loosen during the winding process, which will affect the winding effect; moreover, the simple plastic spool has an integral molding structure. While winding, the user needs to manually, repeatedly and passively wind the decorative light string in the storage area of the plastic spool, and the winding operation is time-consuming and laborious.

SUMMARY OF THE INVENTION

The purpose of the utility model is to overcome the shortcomings in the prior art and provide a decorative light string retractable device. By utilization of the retractable device, the decorative light string can be easily and stably retracted, unwinding and winding, which greatly improves the efficiency of retracting, unwinding and winding the decorative light string, makes it more convenient to retract, unwind and win the decorative light string, ensures the storage effect of the decorative light string, and ensures the normal use of the utility model or the decorative light string.

In order to achieve the above purpose, the utility model adopts the following technical scheme:

The invention relates to a decorative light string retractable device, wherein the retractable device comprises a retractable main component and a retractable auxiliary component connected to one end of the retractable main component through a holding component. The retractable main component and the holding component form a storage structure for the decorative light string. The retractable main component is adopted to retract the decorative light string, the holding component is adopted to hold the decorative light string when retracting the decorative light string, and the retractable auxiliary component is adopted to fix one end of the decorative light string when storing the decorative light string in the retractable main component. The holding component is provided with a storage compartment, the storage compartment is adopted for storing items, and a compartment cover is provided at the opening of the storage compartment to prevent stored items from falling out of the storage compartment.

Wherein a through hole is penetrated through the middle part of the retractable main component, a clamping edge is annularly arranged on one side of the retractable main component near the edge of the through hole, wherein one side of the holding component is convex outward to form a storage section, at least two first buckles are arranged on the end face edge of the storage section, and when the holding component is arranged to insert through the through hole, each first buckle is connected to the clamping edge.

Wherein the storage compartment of the holding component is concavely arranged in the storage section, one of the openings of the storage compartment is provided with a fixing hole, other positions of the opening of the storage compartment are provided with at least two clamping holes, wherein one of the edges of a compartment cover is provided with a mounting hole correspondingly connected with the fixing hole, and the other positions of the edges of the compartment cover are respectively provided with a second buckle corresponding to the positions of each clamping hole, and each second buckle is connected to the corresponding clamping hole.

Wherein the other surface of the retractable main component extends outwardly along the edge of the through hole to form a connecting section, the end surface of the connecting section is provided with at least a bayonet, one surface of the retractable auxiliary component extends outwardly to form a flange, the end surface of the flange is provided with a clamping edge, and at least a clamping block is arranged on the inner side of the clamping edge, and the clamping block is connected with the bayonet.

Wherein at least one clamping part is arranged on the flange of the retractable auxiliary component, and the clamping part is used for fixing one end of the decorative light string when the decorative light string is stored in the retractable main component.

Wherein the retractable device further comprises a handle connected with the retractable main component, or the handle is provided by penetrating on the holding component.

Wherein a groove is arranged near the edge of the retractable main component, two sides of the groove are respectively arranged with at least a bump, two sides of at least one end of the handle are respectively concavely arranged with connecting grooves, and each connecting groove is connected with the corresponding bump.

Wherein a first connecting hole is provided in the middle part of the holding component, a first connecting hole penetrates the storage compartment, the first connecting hole is used for passing through the handle, and the middle part of the storage compartment cover is provided with a second connecting hole, the second connecting hole is matched with the first connecting hole for passing through the handle.

Wherein one part of the holding component extends from the edge of the holding component to a position close to the storage compartment to open a wire clamping opening, and the wire clamping opening is used for clamping the decorative lamp string.

Wherein the edge of the holding component is also provided with a first cut surface, and the position of the retractable main component corresponding to the first cut surface is provided with a second cut surface, and the first cut surface and the second cut surface form a placement structure.

The beneficial effect of the present utility model is that the retractable main component of the decorative light string retractable device is formed to a relatively rotatable retractable structure by means of the storage section sleeved on the holding component through a connecting section, and then, in conjunction with the clamping part of the retractable auxiliary component to fix one end of the decorative light string in advance. At this time, if the retractable main component is rotated, one end of the decorative light string is fixed in advance by the clamping part, and the retractable auxiliary component rotates synchronously with the retractable main component, so that the decorative light string will automatically wind onto the connecting section of the retractable main component with the rotation of the retractable main component, thereby making the winding operation more time-saving and labor-saving, ensuring that the decorative light string can be stably wound on the connecting section of the retractable main component, and ensuring the winding effect of the decorative light string; and the design of the bayonet for the retractable main component and the clamping block for the retractable auxiliary component are combined to ensure synchronous rotation of the retractable auxiliary component; The decorative light string retractable device further cooperates that the first buckle of the holding component is connected to the clamping edge of the retractable main component, wherein the first buckle is only locked on the clamping edge, and can slide along the clamping edge, thereby ensuring the stability of the connection between the retractable main component and the holding component, and ensuring the relative smooth rotation of the retractable main component on the holding component; paired with the handle design, the handle is connected to the groove of the retractable main component, and the retractable main component is transferred, so that the decorative light string can be easily retracted, and when it is necessary to improve the wire laying efficiency, the handle can be used as a rotating shaft, which is penetrated on the first connecting hole of the holding component and the second connecting hole of the compartment cover, and the decorative light string can be unwinding more quickly when pulling the decorative light string outward. The wire clamping opening design thereof on the holding component has a certain fixing effect for the decorative light string, which can effectively prevent the decorative light string wound in the storage structure from loosening at will; in addition, a storage compartment is provided on the holding component. After the decorative light string is wound around the storage structure, the handle and the controller/adapter/remote controller of the decorative light string can be placed in the storage compartment, and the aforementioned items can be stored in conjunction with the compartment cover in the storage compartment to prevent supporting items such as handle/controller/adapter/remote controller from being scattered or lost; It can be seen that by utilization of the utility model, the automatic winding of the decorative light string can be easily realized; the decorative light string can be easily and stably retracted, unwinding and winding, which greatly improves the efficiency of retracting, unwinding and winding the decorative light string, makes it more convenient to retract, unwind and win the decorative light string, ensures the storage effect of the decorative light string, and ensures the normal use of the utility model or the decorative light string.

DESCRIPTION OF THE NUMBER IN FIGURES

Figure 1:
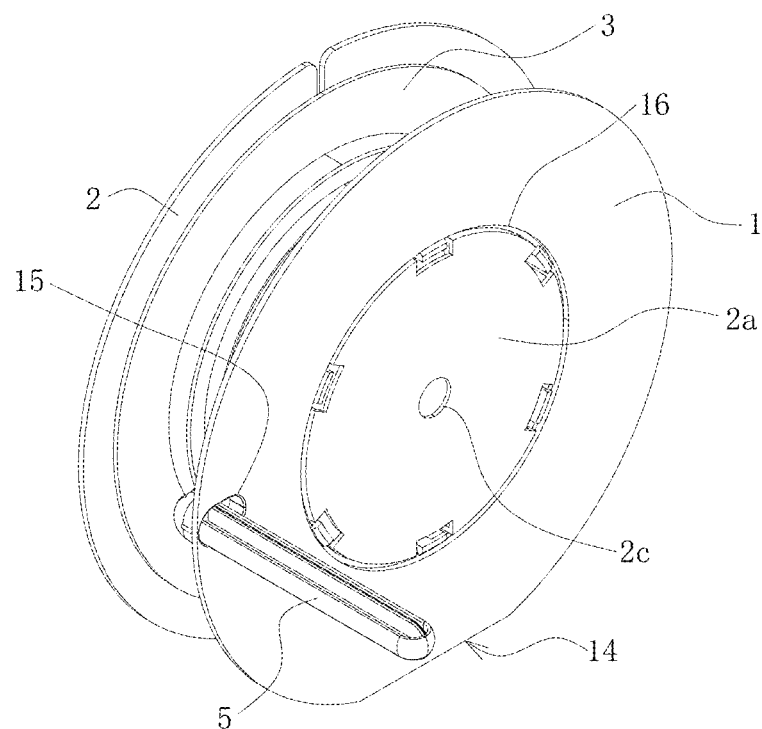
FIG. 1 is a schematic diagram of the 3D structure of the utility model.
Figure 2:
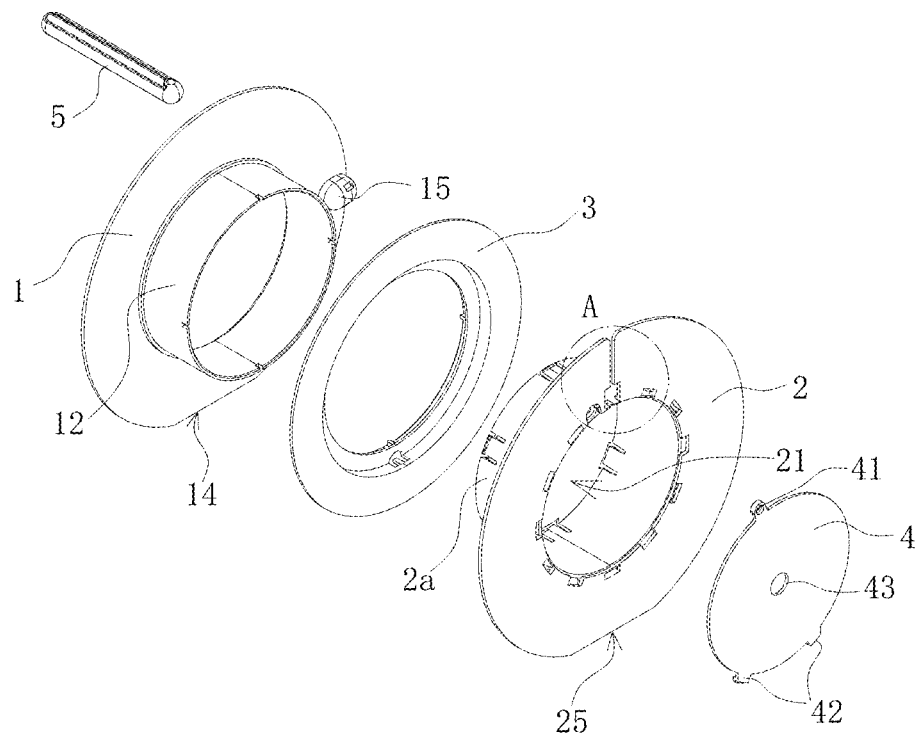
FIG. 2 is a schematic diagram of the explosive structure of the utility model.
Figure 3:
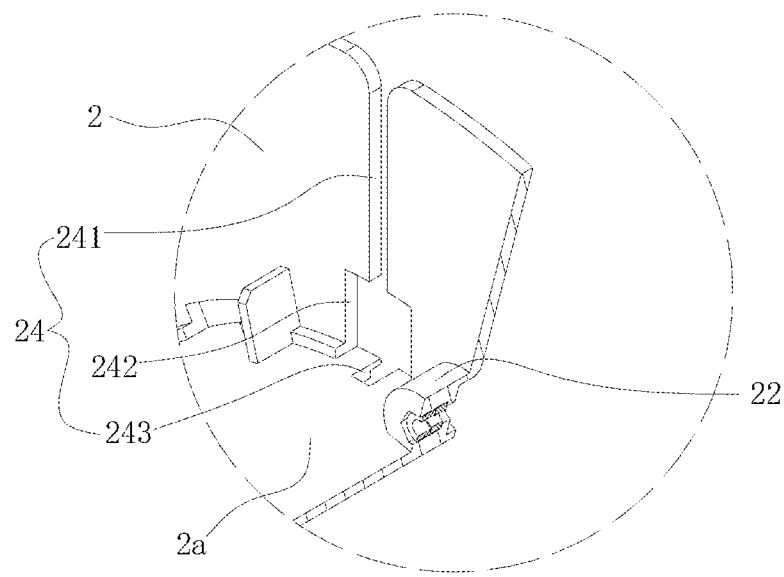
FIG. 3 is a schematic diagram of partial cross-sectional schematic diagram structure at A in FIG. 2.
Figure 4:
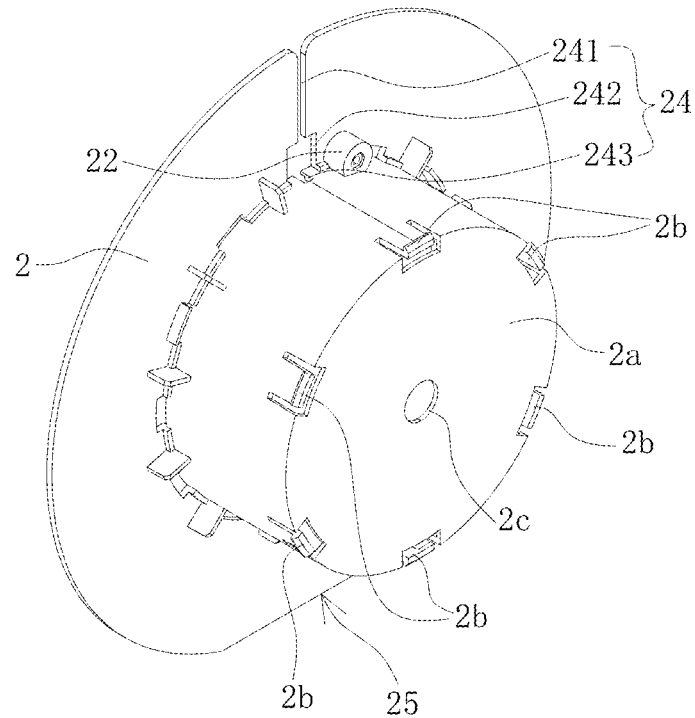
FIG. 4 is a schematic diagram of the holding component structure of the utility model

1—Retractable main component; 11—Clamping edge; 12—Connecting section; 13—Bayonet; 14—Second section; 15—Groove; 151—Bump; 16—Through hole 2—Holding component; 21—Storage compartment; 22—Fixing hole 23—Clamping hole 24—Wire clamping opening 241—Wire guiding section; 242—Joining section; 243—Wire clamping section; 25—First cut surface; 2a—Storage section; 2b—First buckle; 2c—First connecting hole; 3—Retractable auxiliary component; 31—Flange; 32—Clamping edge; 33—Clamping block; 34—Clamping part; 4—Compartment cover; 41—Mounting hole; 42—Second buckle; 43—Second connecting hole; 5—Handle; 51—Connection groove

DETAILED DESCRIPTION OF THE EMBODIMENTS

The utility model will be further described below with reference to the figures of the description:

As shown in FIGS. 1-9, the present utility model relates to a decorative light string retractable device, which comprises a retractable main component 1 and a retractable auxiliary component 3 connected to one end of the retractable main component 1 through a holding component 2. The retractable main component 1 and the holding component 2 form a storage structure for the decorative light string. The retractable main component 1 is adopted to retract the decorative light string, the holding component 2 is adopted to hold the decorative light string when retracting the decorative light string, and the retractable auxiliary component 3 is adopted to fix one end of the decorative light string when storing the decorative light string in the retractable main component 1. The holding component 2 is provided with a storage compartment 21, the storage compartment 21 is adopted for storing items, and a compartment cover 4 is provided at the opening of the storage compartment 21 to prevent stored items from falling out of the storage compartment 21. Specifically, one end of the decorative light string is connected with a power adapter (not shown) through a controller (not shown), and when the controller has a built-in remote control module (not shown), the remote control module is wirelessly connected (such as infrared connection or Bluetooth connection, etc.) with the remote controller (not shown), and the opening and closing and light emission mode of the decorative light string are remotely controlled by the remote control module and the remote controller.

As shown in FIGS. 1, 2, 4 and 5, a through hole 16 is penetrated in the middle part of the retractable main component 1, a clamping edge 11 is annularly arranged at the edge of one side of the retractable main component 1 near the through hole 16, wherein one side of the holding component 2 is convex outward to form a storage section 2a, at least two first buckles 2b are arranged on the end face edge of the storage section 2a, and when the holding component 2 is arranged to insert through the through hole 16, each first buckle 2b is connected to the clamping edge 11; The design of the first buckle 2b and the clamping edge 11 enables the retractable main component 1 to rotate around the storage section 2a of the holding component 2 without separating from the storage section 2a, thereby ensuring the stability of the structural connection between the retractable main component 1 and the holding component 2 during the operation of the utility model.

As shown in FIGS. 1-4, 7, and 9, the storage compartment 21 of the holding component 2 is concavely arranged in the storage section 2a, one of the openings of the storage compartment 21 is provided with a fixing hole 22, and other positions of the opening of the storage compartment 21 are provided with at least two clamping holes 23, wherein one of the edges of a compartment cover 4 is provided with an mounting hole 41 correspondingly connected to the fixed hole 22, and the other positions of the edges of the compartment cover 4 corresponding to each clamping hole 23 are respectively provided with a second buckle 42, which are correspondingly connected with the clamping hole 23. By cooperating with the corresponding clamping holes 23 through the second buckles 42, the compartment cover 4 can be effectively clamped to the opening area of the storage compartment 21; Among them, one end of the fixing hole 22 is provided with a nut, or a nut is embedded in the fixing hole 22, and when the compartment cover 4 is connected to the storage compartment 21, the mounting hole 41 is locked and fixed on the fixing hole 22 with a screw to further fix the connection between the compartment cover 4 and the storage compartment 21, so as to prevent the compartment cover 4 from displacing and the stored items in the storage bin 21 from falling out of the storage compartment 21.

As shown in FIGS. 1-3, 5 and 9, the other side of the retractable main component 1 extends outward along the edge of the through hole 16 to form a connecting section 12, the connecting end has an annular structure, and the connecting section 12 is sleeved on the storage section 2a. When the retractable main component 1 is rotated to retract the decorative light string, the retractable main component 1 rotates around the storage section 2a through the connecting section 12; the end face of the connecting section 12 is provided with at least one bayonet 13, one of the retractable auxiliary component 3 extends outward to form a flange 31, the end face of the flange 31 is provided with a clamping edge 32, at least one clamping block 33 is arranged inside the clamping edge 32, the clamping block 33 is connected with the bayonet 13, and the matching design of the bayonet 13 and the clamping block 33 can make the retractable auxiliary component 3 and the retractable main component 1 rotate synchronously at the time of the retractable main component 1 rotating, so as to ensure that the decorative light string can be effectively wound on the connecting section 12; When the first buckle 2b of the holding component 2 is connected to the clamping edge 11, the end of the connecting section 12 of the retractable main component 1 is clamped to the clamping edge 32 of the retractable auxiliary component 3, and a winding structure of the decorative light string is formed between the retractable main component 1 and the retractable auxiliary component 3, and the area of the maximum end surface of the holding component 2 is substantially the same as that of the maximum end surface of the retractable main component 1, and a storage structure of the wound decorative light string is formed between the retractable main component 1 and the holding component 2.

As shown in FIGS. 1, 2, 6 and 9, the flange 31 of the retractable auxiliary component 3 is provided with at least a clamping part 34 for fixing one end of the decorative light string when the retractable main component 1 is stored in the decorative light string; and when the retractable main component 1 rotates, especially when the decorative light string is wound, the clamping part 34 can fix one end of the decorative light string in advance, so as to prevent the decorative light string from being randomly displaced during winding and ensure the winding effect of the decorative light string.

As shown in FIGS. 1, 2, 8 and 9, the retracting device further comprises a handle 5 which is connected to the retractable main component 1 or which is threaded on the handling component 2.

Figure 5:
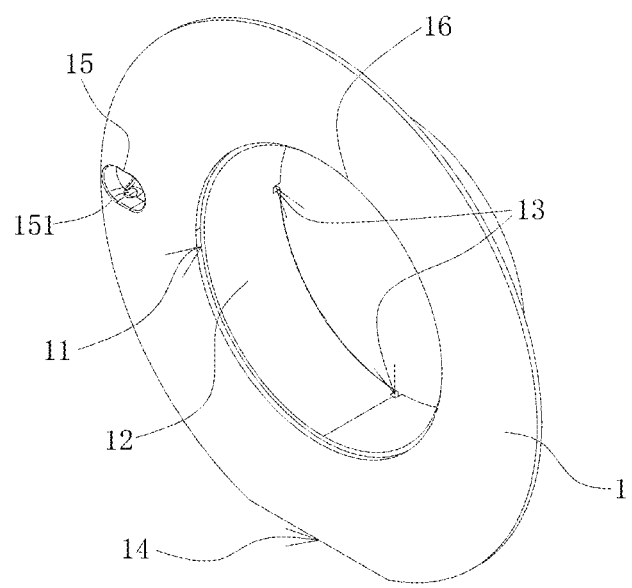
FIG. 5 is a schematic diagram of the retractable main component structure of the utility model.
Figure 6:
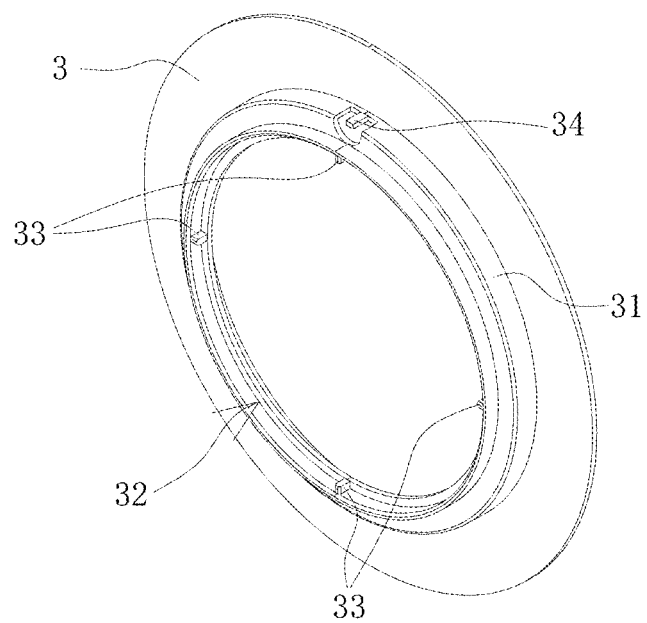
FIG. 6 is a schematic diagram of the retractable auxiliary component structure of the utility model.
Figure 7:
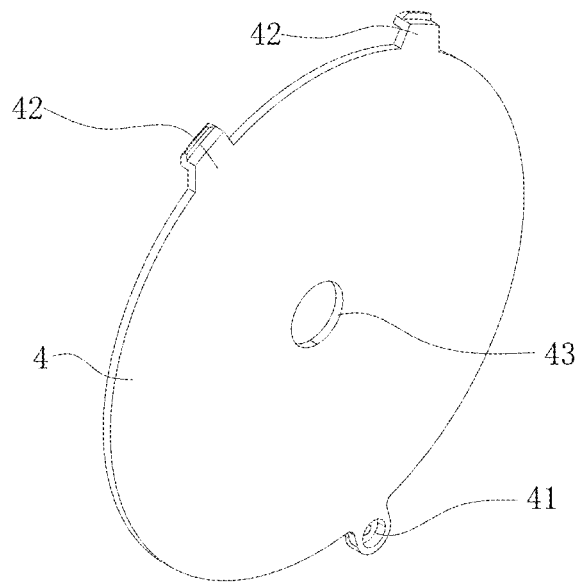
FIG. 7 is a schematic diagram of the compartment cover structure of the utility model.
Figure 8:
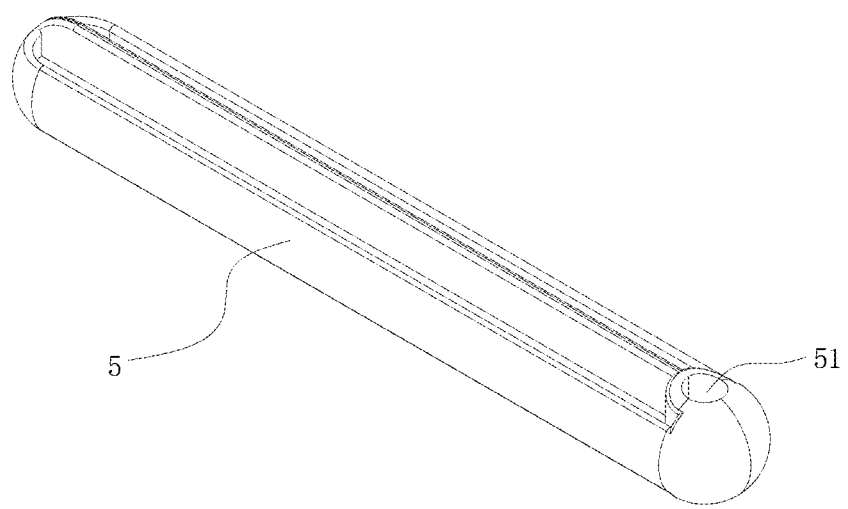
FIG. 8 is a schematic diagram of the handle structure of the utility model.
Figure 9:
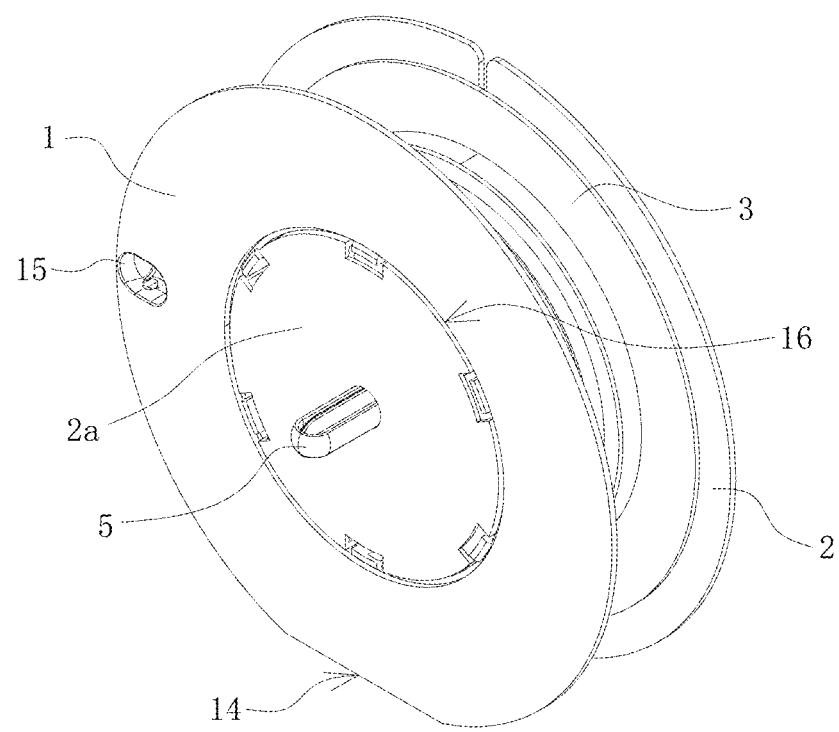
FIG. 9 is a schematic diagram of another use state structure of the utility model.

As shown in FIGS. 1, 5 and 9, a groove 15 is provided near the edge of the retractable main component 1, two sides of the groove 15 are respectively provided with at least one bump 151, two sides of at least one end of the handle 5 are respectively concavely provided with connecting grooves 51, and each connecting groove 51 is connected with the corresponding bump 151; the handle 5 is matched with the structural design of the groove 15, so that the user can rotate the retractable main component 1 more labor-saving, and it is more convenient to retract the decorative light string.

As shown in FIGS. 1, 2, 4, 7 and 9, a first connecting hole 2c is provided in the middle part of the holding component 2, the first connecting hole 2c penetrates the storage compartment 21, the first connecting hole 2c is used for passing the handle 5, and the middle part of the compartment cover 4 of the storage compartment 21 is provided with a second connecting hole 43, and the second connecting hole 43 matches the first connecting hole 2c for passing the handle 5; The structural design of the first connecting hole 2c of the holding component 2 and the second connecting hole 43 of the compartment cover 4, combined with the handle 5 as the rotating shaft, can effectively improve the unwinding efficiency of the decorative light string and make the unwinding of the decorative light string more smooth.

As shown in FIGS. 1-4 and 9, one of the holding component 2 extends from the edge of the holding component 2 to a position near the storage compartment 21 to open a wire clamping opening 24, and the wire clamping opening 24 are used for clamping the decorative light string; Among them, the wire clamping opening 24 is composed of a wire guiding section 241 extending from the edge of the holding component 2 to the storage compartment 21, a connecting section 242 connected to one end of the wire guiding section 241, and a wire clamping section 243 extending from one end of the connecting section 242 to the storage compartment 21. When the decorative light string is wound in the storage structure, one end of the decorative light string connected to the controller and adapter enters the wire clamping section 243 through the wire guiding section 241 and the connecting section 242, and both the controller and adapter are placed in the storage compartment 21; In addition, the aforementioned handle 5, and the remote controller, etc., when storing the decorative light string, can also be put into the storage compartment 21 together, so as to avoid loss and affect the subsequent normal use of the utility model.

As shown in FIGS. 1, 2, 4, 5 and 9, the edge of the holding component 2 is also provided with a first cut surface 25, and the position where the retractable main component 1 corresponds to the first cut surface 25 is provided with a second cut surface 14. The first cut surface 25 and the second cut surface 14 form a placement structure. The design of the placement structure can improve the placement stability of the utility model after storing the decorative light string.

When it is necessary to use the decorative light string for decoration, it only needs to unscrew the screw at the mounting hole 41, remove the compartment cover 4, then take out one end of the decorative light string from the wire clamping opening 24, then hold the holding component 2, pull it to the decorative light string, and make the retractable main component 1 passively rotate to unwind the decorative light string; If you want to improve the smooth effect of unwinding, the compartment cover 4 can be reinstalled at the opening of the storage compartment 21 and locked by screws, and then the handle 5 can be inserted between the first connecting hole 2c of the holding component 2 and the second connecting hole 43 of the compartment cover 4, and the handle 5 is used as a rotating shaft to pull outward to the decorative light string, so that the holding component 2, the retractable main component 1 and the retractable auxiliary component 3 can rotate around the handle 5 synchronously, and the decorative light string can be easily unwinding.

When it is necessary to store the disassembled decorative light string, the compartment cover 4 of the present utility model is in a disassembled state. The handle 5 is clamped onto the corresponding bump 151 in the groove 15 of the retractable main component 1 through the connecting groove 51. Then, one end of the decorative light string is clamped onto the clamping part 34, and the connecting section 12 of the retractable main component 1 is rotated around the storage section 2a of the holding component 2 by using the handle 5. At this time, the retractable auxiliary component 3 rotates together with the retractable main component 1 due to the limit relationship between the clamping block 33 and the bayonet 13 of the retractable main component 1, winding the decorative light string around the connecting section 12 in the storage structure. Then, the other end of the decorative light string is placed into the storage compartment 21 through the wire clamping opening 24, the controller, adapter and other structures are stored into the storage compartment 21, and other items to be stored (such as the handle 5, and the remote controller, etc.) are placed together into the storage compartment, each second buckle 42 of the compartment cover 4 is clamped into the corresponding clamping hole 23, and then the mounting hole 41 are locked with screws to the fixing hole 22. Finally, the utility model is placed on the storage position to complete the storage of the decorative light string; and it should be noted that the design of the wire clamping opening 24 can effectively prevent the decorative light string wound in the storage structure from loosening at will, thus ensuring the storage effect of the decorative light string.

It should be noted that in the description of the utility model, the orientation or positional relationship indicated by the terms "upper", "lower", "inner", "one end", "upper end", "two ends", "one side" or "the other side" are based on the orientation or positional relationship shown in the figures, and are only to facilitate the description of the utility model and simplify the description, rather than to indicate or imply that the referred device or element must have a specific orientation, be constructed and operated in a specific orientation, so it cannot be understood as a limitation on the utility model; Furthermore, the terms "first" and "second" are for descriptive purposes only and cannot be understood to indicate or imply relative importance; unless otherwise expressly specified and limited, the terms "mounted", "provided", and "connected", etc. should be understood broadly, for example, "connected", which may be fixed connection, or detachable connection, or integrally connected; it can be mechanical connection or electrical connection; and it can be directly connected, indirectly connected through an intermediate medium, and it can be the internal communication of two elements. For those skilled in the art, the specific meaning of the above terms in the present utility model can be understood in specific cases; In addition, the standard parts used in the utility model can be purchased from the market, if involving irregular parts, they can be customized according to the records of the description and the figures, and the specific connection mode of each part all adopts the mature conventional means such as screws/bolts, hinge locking firmware, and welding, etc. in the prior art, and the machinery, parts and equipment adopt the conventional models in the prior art, which will not be repeated here.

The above description is only a preferred embodiment of the utility model, and does not limit the scope of the utility model. Therefore, on the premise of not deviating from the design spirit of the utility model, the equivalent changes or decorations made by ordinary engineering technicians in the field on the structure, features and principles described in the utility model should fall within the scope of protection of the patent application of the utility model.

The invention claimed is:

1. A decorative light string retractable device, comprising:
a retractable main component including a through hole, a connecting section, a plurality of bayonets disposed on the connecting section, a clamping edge annularly disposed on one side of the retractable main component proximate the through hole, a groove disposed in an edge of the retractable main component, and two bumps disposed on the groove;
a retractable auxiliary component connected to one end of the retractable main component via a plurality of clamping blocks that are connected to the bayonets, the retractable auxiliary component including a flange disposed on a surface, and a clamping part disposed on the flange;
a holding component including a storage compartment, a compartment cover disposed on an opening of the storage compartment, a storage section disposed on one side of the holding component, and a plurality of first buckles disposed on an end of the storage section; and
a handle including two connection grooves at an end, the connection grooves being configured to receive the bumps respectively;
wherein the clamping blocks are disposed on an inner surface of the clamping edge; and
wherein the holding component is configured to insert through the through hole to connect the first buckles to the clamping edge.

* * * * *